Figure 1:
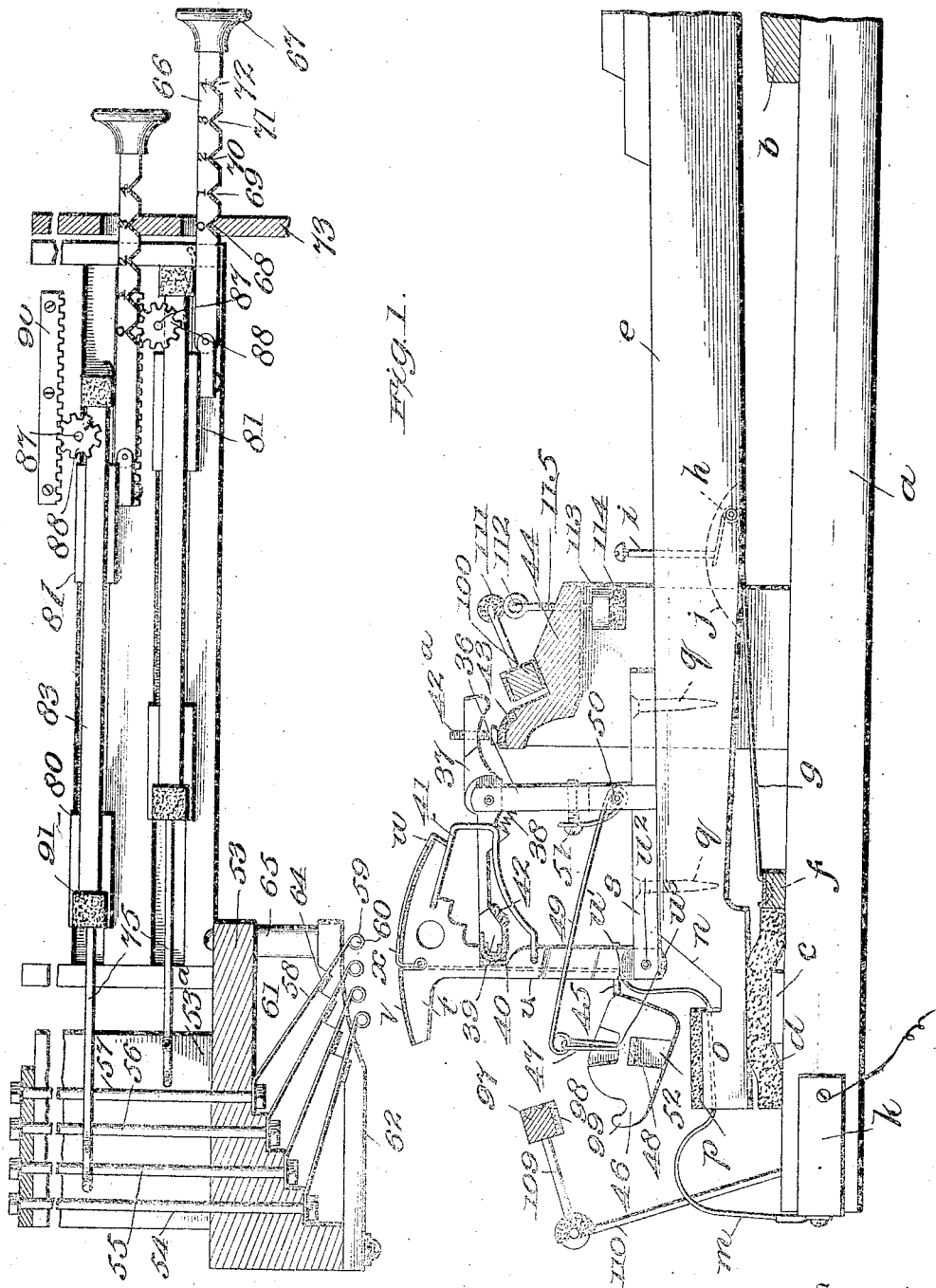

J. W. DARLEY, Jr.
EXPRESSION DEVICE FOR ELECTRIC ORGANS.
APPLICATION FILED JULY 3, 1908.

1,155,300.

Patented Sept. 28, 1915.
5 SHEETS—SHEET 2.

Witnesses

Inventor
John W. Darley Jr.
By Wilkinson, Fisher & Witherspoon
Attorneys

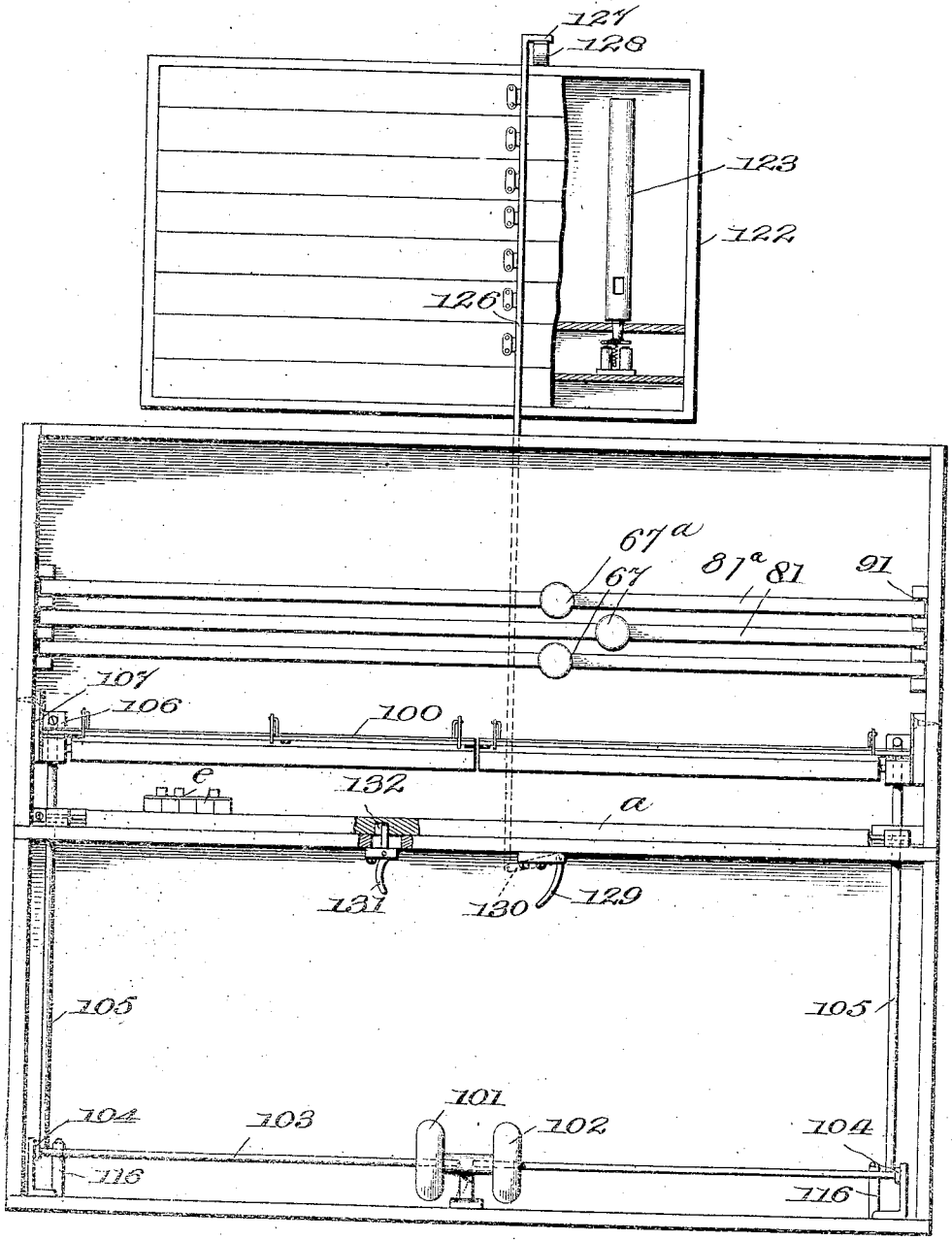

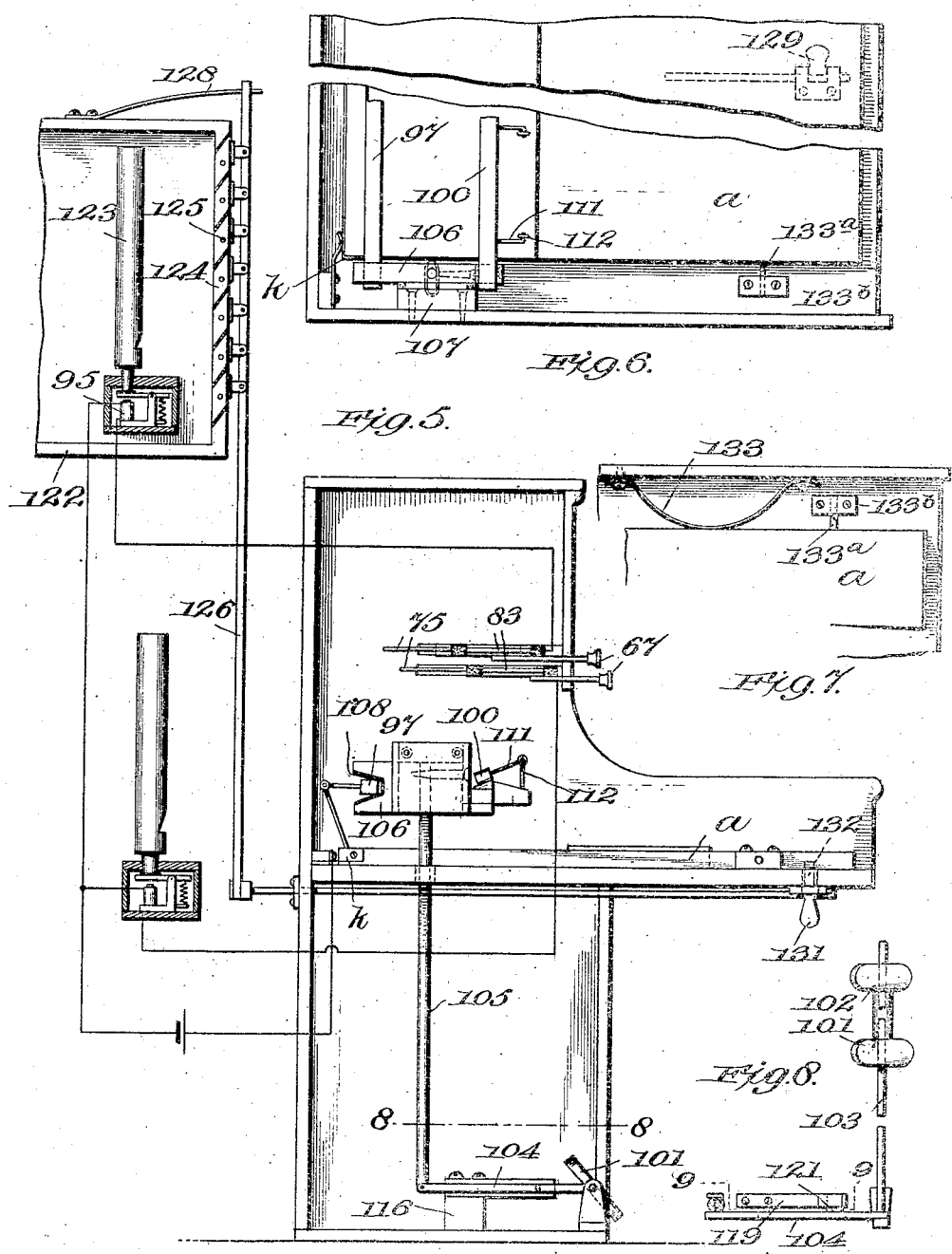

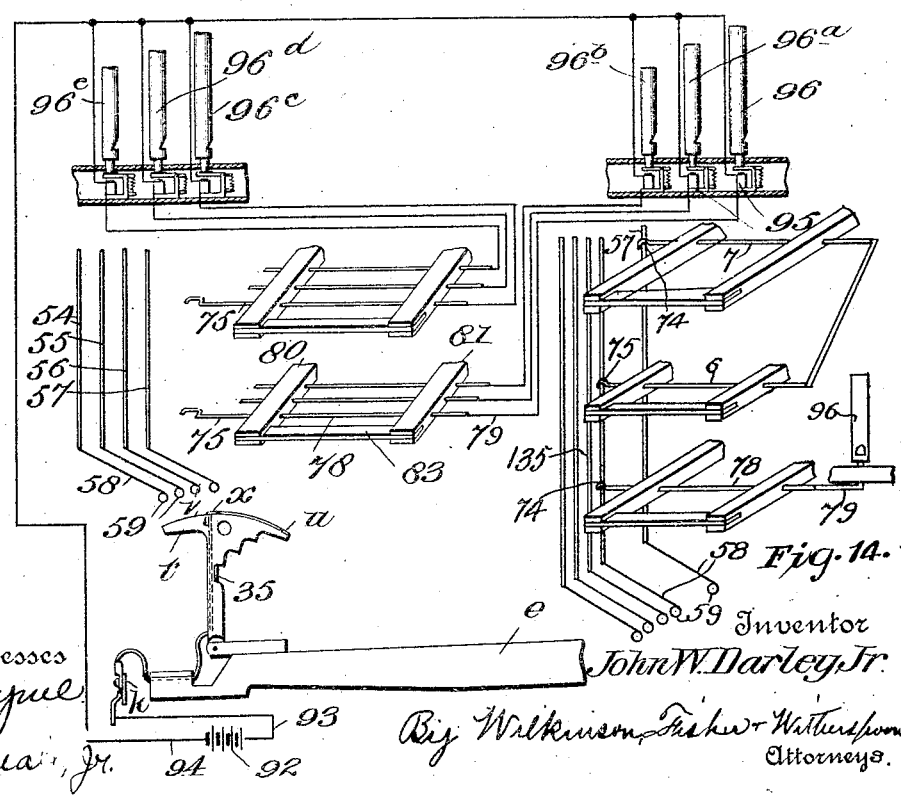

UNITED STATES PATENT OFFICE.

JOHN W. DARLEY, JR., OF BALTIMORE, MARYLAND.

EXPRESSION DEVICE FOR ELECTRIC ORGANS.

1,155,300.  Specification of Letters Patent. Patented Sept. 28, 1915.

Application filed July 3, 1908. Serial No. 441,840.

*To all whom it may concern:*

Be it known that I, JOHN W. DARLEY, Jr., a citizen of the United States, residing at Baltimore, in the State of Maryland, have invented certain new and useful Improvements in Expression Devices for Electric Organs; and I do hereby declare the following to be a full, clear, and exact description of the invention, such as will enable others skilled in the art to which it appertains to make and use the same.

My invention relates to improvements in musical instruments and is a special improvement upon my Patent No. 881,464, dated March 10, 1908.

As in my former patent, the object of the invention is to provide an inertia-controlled means operated by a key, whereby one or more sound-producing means or vibrating bodies may be thrown into operation by a single movement of said key, the particular sound-producing means, or vibrating body or the number of the sound-producing means, or vibrating bodies that are thrown into operation being determined by the speed impressed upon the key by the performer.

My invention has especial application to organs, harmoniums, and similar instruments, where it is desired to put in operation either a single sound-producing means, or a number of them of the same or different pitch, and of the same or different timbre, by a single movement of the key. At the present time, this is obtained in organs by means of a series of movable stops, which must be moved by hand from time to time, and which either materially interfere with the playing of the performer or else require the services of an assistant, and also preclude the possibility of producing music having the variety of expression such as is produced on the ordinary pianoforte.

The invention may also be adapted to the striking of one or more strings, according to the will of the performer, and in fact is applicable to a large number of instruments.

My invention as shown in the drawings is applied to an organ, in which the speed of movement of the key is caused to be the determining factor in selecting and closing electric circuits, the closing of which will cause the operation of one or more reeds or pipes of the organ, as hereinafter described.

Figure 2:
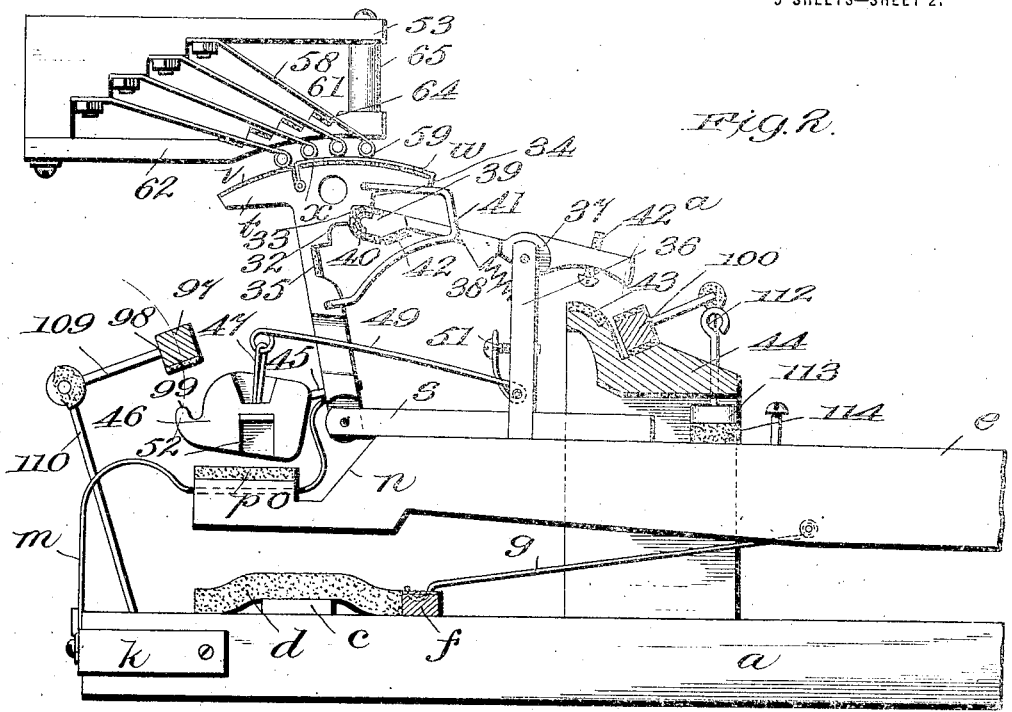
Figure 3:
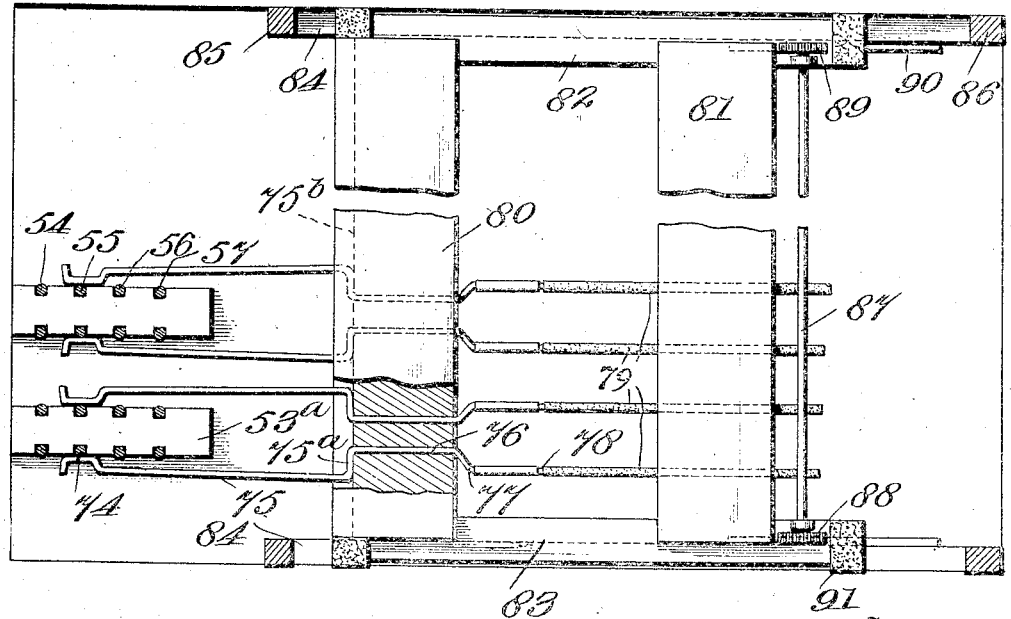

In the accompanying drawings—Figure 1 is a side view showing a key and related parts, and the inertia-controlled contact-maker for closing and varying the electric circuits, parts being shown in section. Fig. 2 is a similar view to Fig. 1, showing the key depressed, the inertia-controlled contact maker being in its third position, closing three of the electric circuits. Fig. 3 is a top plan view of the contact carriage. Fig. 4 is a front view of the organ with parts removed and parts shown in section. Fig. 5 is a side view, partly diagrammatic, some of the parts being removed to show the interior arrangement. Fig. 6 is a broken plan view of one end of the parts shown in Fig. 5, some of said parts being removed. Fig. 7 is a detailed end view of the opposite end of the parts shown in Fig. 6. Fig. 8 is a section on the line 8—8 of Fig. 5, looking downward. Fig. 9 is a section on the line 9—9 of Fig. 8, looking in the direction of the arrow. Fig. 10 is a detail perspective view of the contact-maker and one contact. Fig. 11 is a diagrammatic view showing the electric circuits. Fig. 12 is a diagrammatic view of the series of contacts, and Fig. 13 is a diagrammatic view of the wiring of the couplers. Fig. 14 is a perspective view of the wiring of one pair of coupler frames.

$a$ represents the support for the keys, which extends the entire length of the keyboard and is provided with the usual balance rail $b$, and balance pin, front pin and front stop washer not shown, and a rear stop $c$ covered with a thick layer of felt $d$, which acts as a cushion.

$e$ represents one of the keys which is made in the usual form, except as hereinafter described.

$f$ is a strip fastened to the support $a$, and on this strip are supported a number of springs $g$, one for each key, coiled around the pivot $h$, and the tension of which may be adjusted by the screw $i$, the key being cut away as shown in dotted lines at $j$ for the reception of this spring. This spring is provided to partially counterbalance the effect of gravity upon the rear end of the key and its attached parts, so that the keys may be readily depressed at their front ends, and the tension of the spring is adjustable by the screw $i$ so that the touch of all keys may be made alike.

On the support $a$ is a conducting strip $k$ extending the full length of the key-board, and to said strip are fastened flexible wires $m$, one for each key, which wires run through holes in the rear of the keys $e$. This key is cut away at its rear, as shown at $n$, leaving a projecting portion $o$ covered with felt $p$. Secured to the top of each key by means of screws $q$ are pieces $s$ on the rear end of which is pivotally mounted the inertia-controlled contact-maker, shown in perspective in Fig. 10. This consists of an upright portion $u$ and a sector-shaped portion $t$. The top of this sector-shaped portion is covered by a layer of felt $v$ and over this layer of felt is secured a contact strip $w$, the ends of which are bent down and secured, the one in a recess in the part $t$ and the other over the end thereof. This contact strip, at the ends, is of the full width of the sector-shaped portion $t$, as shown at $x$, but between the ends is cut away, as shown in Fig. 10, and is then only about one-half the width of the piece $t$. The part $u$ is cut away, as shown at $y$, to allow clearance for the spring 49 and is provided with four notches, 31, 32, 33 and 34, the notch 31 being provided with a felt lining 35. The wire $m$, after passing through the part $o$ of the key, passes through a hole at $u'$ at one side of the part $u$ and thence upwardly over the side of the part $u$ of the contact-maker and is connected with the contact-strip $w$ on the top of the contact-maker.

To each part $s$ is attached an upright standard 36, and in the top of this standard is pivotally mounted a lever 37. A spring 38 is located between said lever and the standard 36 and normally tends to press the rear end of the lever upward. This rear end is provided with an expanded head 39 adapted to engage in one of the recesses 31, 32, 33 and 34, and is provided with a felt strip 40.

41 represents a guiding wire, the ends of which are fixed in the parts $t$ and $u$, respectively, of the contact-maker, and the front of the head 40 is provided with a felt cushion 42 adapted to engage with this guiding wire so as to keep it always in the vertical plane of the contact-maker and to guide the head 39 into one of the notches 31, 32, 33 and 34, as the case may be. It will be noted that the wire 41 is eccentric with reference to the center $u^2$, and is substantially parallel with the edges forming the outer extremities of the notches 31, 32, 33 and 34. Hence as the contact-maker moves from the position shown in Fig. 1, to that shown in Fig. 2, if for any reason the head 39 should not be raised sufficiently fast by the spring 38, the wire 41 will strike the pad 42 and lift the head 39 to a position determined by the maximum movement of the contact-maker, then as the spring 49 tends to return the contact-maker toward the position shown in Fig. 1, the head 39 drops into the appropriate notch such as 33 in Fig. 2. Hence the head 39 is always set in the correct stopping position by the contact-maker, and all that the spring 38 has to do is to prevent the head 39 from falling before the proper notch bears against it. The front of the lever 37 is provided with an adjusting screw $42^a$ which is adapted to rest, when the parts are in the position shown in Fig. 1, upon the felt strip 43 of the rail 44.

Attached to the rear of each contact-maker by means of a pin 45 is a weight 46 preferably made of lead. This is hollowed out near the center and is provided with a loop 47, of flexible material, which passes down through a perforation in the weight and is attached to a leather head 48. The upper end of the loop 47 engages one end of a spring 49 which is coiled around a pivot pin 50 mounted in the standard 36, the free end of this spring engaging an adjusting screw 51 in the standard 36, whereby the tension of the spring may be varied.

The contact-maker and the parts carried thereby are so proportioned that the center of gravity of the entire mass, which is pivotally supported in the rear end of the piece $s$, is at or near the point of attachment $u^3$ of the loop 47 to the weight 46, so as to avoid all unequal stress, and the weight 46 is carefully shaped with this end in view. In determining the shape originally the weight 46 is purposely cast a trifle too heavy and then is cut away gradually around the outside so as to obtain the exact balance desired. During the shaping operation, the location of the center of gravity is obtained from time to time in the well known manner, so that the cutting may be judiciously done having the above result in view. The parts are so proportioned that a light blow upon the key will throw the contact-maker up without disengaging the rear end of the lever 37 from the recess 31. A heavier blow will throw the parts up and throw the contact-maker backward under the influence of its inertia acting against the spring 49, so as to release the rear end of the lever 37 which will then engage with the notch 32. A still heavier blow will cause the rear end of the lever 37 to engage the notch 33, and similarly a still heavier blow will cause the rear end of the lever 37 to engage with the notch 34. This effect is obtained because the inertia of the contact-maker can be considered as acting at $u^3$, at the end of the lever arm from $u^2$ to $u^3$. When the key returns to its normal position, shown in Fig. 1, the screw $42^a$ strikes the pad 43, withdrawing the head 39 from the notch with which it was in engagement, and the spring 49 returns the contact-maker to its normal position, also shown in Fig. 1.

53 represents a supporting rail which extends the full length of the key-board. Secured in the rail 53, above each key, are four wires 54, 55, 56 and 57, four being shown for each key, although a greater number could be used if desired. Between the wires belonging to alternate pairs of keys there is placed the grooved distance piece 53$^a$ which serves to keep the wires straight and in position, and also as an insulating bearing for the springs 75. To the end of each wire is attached a flexible conductor or contact strip 58 which terminates in a ring 59 in which is located a wooden pin 60, this pin being used to prevent the spring from giving a rasping noise when struck by the contact-maker as hereinafter described. To the rear of the rail 53, which is cut away as shown at 61, is attached a horizontal guide 62, one for each two keys, the front of which on its upper side is dentated and on its lower side is curved, as shown in Fig. 1, alongside of which the contact strips pass, layers of felt 64 being provided on the dentated upper side on which projections 63 on the strips 58 rest, as shown in Fig. 10. The springs 58 are made rights and lefts so that one piece 62 serves for two sets of springs. 65 represents a distance piece separating the front end of the part 62 from the front end of the rail 53.

The parts are so proportioned that when a light blow is struck upon one of the keys the contact-maker will be thrown up and only the front ring 59 will contact with the contact-strip $w$ on the top of the contact-maker. If a heavier blow is struck two of said rings will be brought into contact with said strip; if a still heavier blow is struck three of said rings will be so thrown into contact with the strip $w$, as shown in Fig. 2, and if a still heavier blow is struck all four of the contact rings will be brought in contact with the strip $w$.

Movable stops are provided, of which there may be any desired number, for connecting the magnet of any sounding means with either of the vertical wires 54, 55, 56 and 57 of its corresponding key. These are best shown in Figs. 1, 3 and 11. 66 represents the connecting rod of one of said stops which is provided with a draw stop 67 on which is engraved the name of the particular pipes which said stop controls, such as flute, trombone, etc. The rod 66 is provided with five notches 68, 69, 70 71 and 72 on its lower face, made triangular in shape and adapted to engage a similar shaped part of the front casing 73 of the organ, which is cut away to permit ready movement of the rod 66. Above these notches are figures 0, 1, 2, 3 and 4. The mark 0 over the notch 68 indicates that when that notch engages with the casing 73 there is no contact made with any of the upright wires 54 to 57 inclusive. When the notch 69 is engaged with the casing the 1 above the notch 69 means that the connecting wire is engaged with the first of the upright wires, or the wire 57. Similarly by moving the rod the spring contact wires may be caused to contact with either one of the four wires 54 to 57. These wires are best shown in Fig. 3, each of them consists in a bent rear portion 74 adapted to engage with one of the vertical wires, then a part 75 connected thereto and inclined away from the bracket 53$^a$, then a shoulder 75$^a$ which fits in a groove 75$^b$ in the board 80 and prevents the spring from turning, then a straight portion 76, then an inclined portion 77, and finally a straight portion 78 which is connected to a wire 79 leading to one of the pipes, as shown in Fig. 11. The part 76 passes through perforations in a horizontal board 80 which forms one part of a movable carriage which extends the full length of the key-board. This carriage is rectangular in form, consisting of the horizontal part 80, a board 81 parallel thereto, and connecting parts 82 and 83 arranged parallel to the sides of the organ. This carriage is adapted to slide in guides 84 at the sides of the organ and is provided with rear stops 85 and front stops 86 limiting the motion in either direction.

It will be seen that the carriage, which contains one contact wire for each key, is rectangular in shape and slides in the guides 84. To insure easy movement and to prevent the carriage from sticking in the guides, I have provided a rack and pinion arrangement best shown in Figs. 1 and 3. The rod 66 is pivotally connected to the board 81, and the parts 82 and 83 are provided with bearings in which is mounted a shaft 87 which carries on each end thereof small gear wheels 88 and 89. These gear wheels mesh with racks, such as 90, carried on the guides 84 so that each side of the carriage will be pushed forward at an equal speed, thus preventing sticking, and each corner of the carriage is provided with a felt covering, such as 91, causing the carriage to slide easily. Any number of these carriages may be used, one above the other, one draw stop being used for each carriage.

The electric means for operating the pipes will next be described, reference being had especially to Fig. 11, in which only two spring contact wires are shown complete, the ends of the others being broken off. The conducting strip $k$ is connected with the battery 92 by means of a wire 93, and from this battery leads a wire 94 which is connected to one side of the magnets of all the pipes; the other side of each magnet is connected by a wire, such as the wire 79, to a spring 78 which is carried by one of the moving carriages. Each one of the magnets, such as 95, controls one of the pipes 96, 96ª, 96ᵇ, 96ᶜ, 96ᵈ and 96ᵉ. It is obvious that when one of the carriages is moved by the corresponding draw stop until the notch 69 engages the organ casing the spring conducting wires 75 will connect with the vertical wires 57, and if a key is struck a light blow that the circuit will be completed through the appropriate ring in the first row of the rings 59 and the pipe 96 caused to be sounded, while if the stop were moved so that the spring conducting wires 75 connected with another set of vertical wires the speed communicated to the key would have to be sufficiently greater to cause the inertia-controlled contact-maker to make contact with the corresponding one of the rings 59.

Means are also provided whereby after a key has been struck, the position of the contact-maker may be varied at will, producing a crescendo or a diminuendo movement. This is done by pedal-operated mechanism, shown in Figs. 1, 4, 5, 6 and 8.

97 represents a bar extending one-half the length of the key-board, two of such bars being provided. These bars each have a felt footing 98 adapted, when the bar is pressed down, to strike a projection 99 on the weight 46. It is obvious that a depression of the bar 97 will depress the weight 46 carrying with it the contact-maker and throwing the part $t$ of the contact-maker to the rear, increasing the number of contact rings 59 which engage with the contact strip $w$ and thus producing a crescendo movement.

For producing a diminuendo movement I provide a bar 100 provided with felt strips, which bar extends half way across the key-board, there being two of such bars employed. This bar usually rests upon the rail 44, and when this bar lifts upward it engages the front end of the lever 37 disengaging the rear end of said lever from the notches and allowing the contact-maker to move forward under the influence of the spring 49, decreasing the number of contact rings 59 which engage with the contact strip $w$ and thus producing a diminuendo movement. These two sets of bars are operated by the pedals shown in Figs. 4 and 5.

101 represents the pedal connected to the bars 97 and 100 on the left of the organ, and 102 represents the pedal connected to the bars on the right hand side of the organ. The pedal 101 is fixedly connected to a rod 103, and on the outer end of this rod is fixedly mounted a lever 104, the rear end of which is pivotally connected to a rod 105 which slides in a suitable bearing. On the top of the rod 105 is mounted a block 106 which bears against a felt covered projection 107 secured to the side casing of the organ. The block 106 is cut away at the rear leaving a V-shaped recess 108 which is lined with felt and which engages the bar 97. This bar 97 is pivotally supported on rods, such as 109, which in turn are supported by rods 110 fixed in the part $a$ of the organ. From the connections described it is evident that an up or down movement of the block 106 will cause the bar 97 to swing in the arc of a circle.

The front part of the block 107 is cut away and inclined to form a resting place for the bar 100 which is supported by rods 111, which in turn are supported by rods 112 carried by the rail 44, which rail is provided with a stop 113 having a felt cushion 114 which may be adjusted by the screw 115 to limit the upward movement of the key $e$. It is obvious from the connections described that the upward movement of the block 106 moves the rails 97 and 100 upwardly, in which case the rail 97 will have no effect, but the rail 100 will strike the levers 37 extending over half the length of the key-board, causing a diminuendo movement. It is also obvious that the downward movements of the block 106 will move the rail 97 downward, having no effect upon the levers 37, and this downward movement of the rail 97 will cause a crescendo movement.

When the pressure is removed from the pedal it will automatically be caused to resume its former position by the following means.

116 represents a block fastened to the base of the organ, to the top of which is fastened another block 117 extending at right angles thereto. Above the block 117 is a spring 118 and below the block 117 is another spring 119. Screws 120 firmly secure these blocks and springs together and to the base of the organ. The arm or lever 104 is provided with a projecting portion 121 located between the springs 118 and 119, as shown in Fig. 9, and it is obvious that one or the other of these springs will move the pedal 101 into the position shown in Fig. 5 if no pressure is exerted upon the pedal. The pedal 102 is adapted to operate similar rails on the right hand half of the organ by precisely similar connections. It will thus be seen that the pedal 101 has three positions, a neutral position, as shown in Fig. 5, a position when the top of the pedal is pressed down by the toe, producing a crescendo movement, and another position when the front of the pedal is pressed down by the heel, producing a diminuendo movement.

I also provide means for producing swells, best shown in Figs. 4 and 5. 122 represents a swell box in which are mounted pipes 123, the front of said box being provided with inclined slats 124 provided with felt cushions and adapted to fit tightly together, as shown in Fig. 5. Each of these strips is supported on pivots, such as 125. Each of these slats is pivotally connected to an upright rod 126, the upper part of which is bent over, as shown at 127, engaging a spring 128 which normally holds said rod in its highest position and holds the slats or strips 124 closed. The rod 126 is operated by the knee of the performer by means of the following mechanism.

129 represents a curved arm pivotally mounted on the part $a$ of the organ and having connected thereto a rod which runs rearwardly, and which rod at its rear end is provided with a link rigidly fastened thereto, the other end of the link being pivotally fastened to the lower end of the rod 126. It is obvious that a movement of the part 129 to the right from the position shown in Fig. 4 will open the slats of the swell box, which will be closed by the spring 128, when the pressure is removed.

I have also provided means whereby the performer, by the movement of his knee, may automatically lessen the number of contact rings engaged by the contact $w$ on top of the contact-maker. This strip, as shown in Fig. 10, has its central portion cut away, but the ends thereof are of the full width of the top of the contact-maker. It is obvious that a shifting of the contact-maker from the position shown in Fig. 10 to the right will disconnect all of the contact rings from the contact $w$, except the ring which bears on the portion $x$. The portion $x'$ of the contact $w$ never moves sufficiently to contact with any of the rings, the motion of the contact-maker to the rear being limited by the pad $p$. This shifting is accomplished in the following manner. The entire key-board is arranged to slide a short distance, and this sliding action is caused by the knee of the performer who presses his left knee against the lever 131 which is pivotally mounted on the front of the organ and has a rearwardly projecting portion which projects into a slot 132 in the key-board frame. This will shift the key-board bodily to the right against the tension of the spring 133, best shown in Fig. 7, which spring will restore the key-board to its normal position when the pressure is removed from the lever 131, the key-board frame being guided during this movement by the studs 133$^a$, 133$^a$, rigidly secured thereto, which slide in the guides 133$^b$, 133$^b$, which are screwed to the part $a$.

Referring to Fig. 1, it is evident that if the rod 66 is pushed in one notch from the position shown, the contact wires controlled thereby will contact with the first series of vertical wires, one of which is the wire 57; if it is pushed in one notch farther they will contact with the second series, one of which is the wire 56; and similarly they may be made to contact with the third and fourth series represented by the wires 55 and 54, respectively. Now when the lower draw stop 67 is pushed in so that connection is made with the first series of vertical wires, the pipe 96 will be sounded when the corresponding key is slowly depressed thus bringing the contact-maker into contact with the front contact ring 59. Similarly if the draw stop 67 is pushed in so that connection is made with the second series of vertical wires, the pipe 96 will be sounded only when the depression of the key is made with sufficient speed to bring the lever 37 into the notch 32, thus bringing the contact-maker into contact with the second contact ring, and so on. The same is true of the other draw stops, only two of which are shown in Fig. 1, but of which any desired number might be used. It will thus be seen that each draw stop and its attached mechanism is entirely independent of all others and its contact wires may be placed in contact with any one of the four series of vertical wires represented by the wires 54, 55, 56 and 57. Thus any desired grouping can be made, and each group will sound when, and only when, the corresponding speed of key depression is obtained, this statement being true whether the key-board is in the position shown in Fig. 4 or whether it is displaced therefrom by the lever 131 as before explained, the only difference between the two modes of operation being that in the first case all the pipes connected to all the vertical wires up to and including the one corresponding to the last contact ring bearing on the contact $w$ are sounded, whereas in the second case only the pipes connected to the vertical wire corresponding to the last contact ring are sounded since only the last ring bears on the part $x$ of the contact $w$. By last ring is meant that one of the four which happens to bear on the part $x$ or is in line therewith on the contact $w$, depending on whether the key-board is shifted or not and on the speed of key depression. Hence any number of a plurality of pipes or of a plurality of groups of pipes can be sounded, or any one of a plurality of pipes, or any one group of a plurality of groups of pipes may be sounded depending only upon the speed with which the key is depressed. It is also evident that the key-board may be shifted while the keys are depressed, producing a change in tone while sounding.

In Fig. 1 there are four vertical wires shown in connection with one key, and each key has, of course, four wires. I have found this sufficient in practice, but I do not limit myself to four wires per key.

To generalize, for each key there is a contact-maker, a group of vertical wires, and contact spring wires carried by a movable carriage or frame. There may be any number of such spring-wire-carriages and vertical wires, the number of notches on the contact-maker $t$ being equal to the number of vertical wires per key, and the number of notches on the stop rods 66 being one more than the number of vertical wires, one notch being for the off position. All of the contact wires mounted in the same frame and operated by the same horizontal draw stop, such as 67, belong to pipes having the same quality of tone, the name of this group of pipes being engraved on the face of the corresponding draw stop. While the two groups of pipes shown in Fig. 11 may be of different qualities of tone they may also be of the same quality of tone. Thus the pipes 96, 96$^a$ and 96$^b$ might be flute pipes, and the pipes 96$^c$, 96$^d$ and 96$^e$ might also be flute pipes of the same pitch as, or either an octave above or below the pipes 96, 96$^a$ and 96$^b$ respectively.

Fig. 12 shows diagrammatic and Fig. 14 shows in perspective the manner of coupling by the stops. 134 represents the four wires for a single key of the choir organ. 135 represents the four vertical wires for a single key at the same position in the keyboard of the great organ, and 136 the four vertical wires for a single key at the same position in the keyboard of the swell organ. There are sets of vertical wires similar to 135, 136 and 134 for each key of great, swell and choir organ respectively. Numbers 1 to 30 are spring contact wires similar to those shown in Fig. 3 at 75, and each organ is here supposed to have ten coupling stops. The coupler-spring-contact-wires 1 to 30 are formed like the wires 75 and mounted in draw stop-controlled frames, such as is shown in Fig. 3 at 75, and each organ is here 84 and 85 in Fig. 3. One of these frames for one set of coupler spring contact wires is shown at 81$^a$ in Fig. 4. The spring contact wires 1 to 10, 11 to 20 and 21 to 30, respectively, are arranged to make contact with any one of the four vertical wires 135, 136 and 134 respectively for each key of the great organ, swell organ and choir organ, respectively. There are spring contact wires similar to 1 to 10, 11 to 20 and 21 to 30 for each key of the great, swell and choir organs respectively; and all the similar spring contact wires are each mounted in the same draw stop-controlled-frame as shown in Fig. 3, there being one draw stop controlled frame carrying all the spring contact wires similar to 1, a draw stop controlled frame carrying all the spring contact wires similar to 2, and so on. There being thus thirty draw stop controlled frames. Hence each of the set of spring contact wires carried by each frame may be caused to make contact with one of the vertical wires belonging to the key to which said contact wire belongs, and all the contact springs carried by one frame, make contact with similar vertical wires, each of which is represented by either 57, 56, 55 or 54 in Fig. 11, and one coupler draw stop for operating one of the coupler frames is shown as at 67$^a$ in Fig. 4.

Fig. 13 is a front diagrammatic view of the spring wires 1 to 30 as shown in Fig. 12, the vertical wires being omitted, the horizontal lines being taken to represent the front view of the frames in which the spring contact wires are mounted, and the dots on these lines being taken to represent the ends of said spring contact wires mounted on the frame. The heavy lines represent connections and the lines L, L', L$^2$, show which spring wires are in line. The spring wires on the line L' are taken to correspond to keys at the same point in the scale in each of the three organ divisions, and those on L$^2$ correspond to the keys an octave higher, while those on L correspond to a key an octave lower. The light horizontal lines arranged in three divisions of ten each, correspond to the same lines on Fig. 12 and represent the frames for the spring contact wires of the swell, great and choir organs, respectively. Referring to Fig. 13 we find in the three organ divisions that 16 and 17, and 14 and 15 in the swell organ division, and 6 and 7, and 4 and 5 in the great organ division, and 26 and 27, and 24 and 25 in the choir organ division, respectively, are connected together.

1 and 28, 10 and 13, and 18 and 23 are connected together, and it is obvious that any one of the vertical sets of wires 134, 135 and 136 in either of the organ divisions may be connected to any one of the vertical set of wires in either of the other organ divisions, the vertical wire belonging to the key of one division being connected to the vertical wire belonging to the key at the same point in the scale of the other division. Since 8 and 11, 3 and 30, and 21 and 20 are connected together, the great organ vertical wires may be coupled to the swell organ vertical wires an octave higher, the great organ vertical wires to the choir organ vertical wires an octave higher, and the choir organ vertical wires to the swell organ vertical wires an octave higher, respectively. Similarly since 9 and 12, 2 and 29 and 19 and 22 are connected, the great and swell organ vertical wires may be similarly coupled as above to the vertical wires of the other organ divisions, but an octave lower, and thus extreme flexibility of control is obtained. The manner of using these couplers is as follows. Taking the super-octave coupler composed of the two frames capable of independent movement; one of which carries a series of contact springs of which one is shown at 6, the other frame carrying a series of contact springs, one of which is shown at 7, consider 6 to be pushed in, to make contact with the second vertical wire, and 7 to be pushed in to make contact with the first vertical wire, then it is evident that when the contact-maker corresponding to 6 makes contact with the first contact ring the pipe or group of pipes connected to the first vertical wire will sound, while if the contact-maker makes contact with the second ring, the super octave of this pipe or group of pipes will sound either with the unison pipe or pipes, or alone, depending on the transverse position of the key-board as before explained. If a second pipe or group of pipes is connected to the second vertical set of wires, in addition to the above mentioned effect this second pipe or group of pipes will sound in the sub octave when contact is made with the first ring, and in unison when contact is made with the second ring. The effect is similar but reversed when the sub octave coupler represented by the springs 4 and 5 is used. When using the octave couplers in the same organ division it is necessary to observe that the two frames in each coupler are never to be pushed into the same notch, but this requirement need not be observed when using the unison, sub and super octave couplers between different organ divisions, the manner of use of which will be evident from the foregoing.

In Fig. 1, two draw stops such as 67 are shown. One of these might be for the trombone register of pipes, the other for the flute register of pipes, and so on, as many of these draw stops being used as desired, and each register of pipes having a separate frame, a horizontal set of spring contact wires and a draw stop projecting through the front frame in the same manner as in an ordinary organ. The connecting rod for each stop carriage is to have one more notch than the number of vertical wires and the number of the notches provided in the inertia controlled contact-maker. Hence any register of pipes may be left entirely disconnected or placed in connection with any set of vertical wires, after which the determination as to which pipes shall sound depends upon the keys that are struck and upon their speed of depression. The vertical wires, of which I have shown four for each key, of course extend high enough to provide room for as many horizontal sets of spring contact wires to bear thereon as there are registers of pipes and couplers in the organ. Hence as many pipes as may be desired can be placed in connection with any vertical wire.

In the claims by "sounding means" is meant any device simple or complex, that is capable of emitting an audible sound. By "vibrating body" is meant anything that is capable of vibrating, whether audibly or not.

In the claims, by "combination," is meant either a single controlling means, or an assemblage of controlling means, that is connected to a single contact strip 58 for control thereby; hence there are as many "combinations" per key as there are contact strips, and consequently in the device shown in the present application there are four "combinations" per key, and each combination may comprehend a single controlling means or a plurality thereof.

The note or its sub or super octave, the note and its sub and super octave, or the note and its sub or super octave can be sounded by a single key.

For the first case the frame 83 whose springs 75 are connected, say to the flute pipes, would be moved to the notch numbered 1, so that its spring 75 would contact with the first row of vertical wires 57. Then if the frame were in the great organ, the coupler stop frame 81ª carrying the contact 6 would be moved in so that 6 would make contact with the second row of vertical wires 56, and the contact 7 would make contact with the first row of vertical wires 57. Similarly the contacts 5 and 4 would be caused to make contact with the rows of vertical wires 55 and 57 respectively. Then the keyboard being moved sidewise so that the portion $x$ only would contact with the rings 59, it is evident that if a key is slowly depressed, the circuit is through the vertical wire 57 only and the note for that key sounds alone, if the key is depressed swiftly enough to complete the circuit through the wire 56, the super octave would sound, and a key depression sufficiently swift to send the current through the wire 55 alone, would sound the sub octave. If the key board were now moved sidewise so that the portion $w$ would touch the contact ring 59, for a slow speed of key depression, the note would sound alone, for a higher speed, the note and its super octave, and for a still higher speed the note, its super and sub octaves would sound.

The third mode of operation is a variation of the mode just noted, the slow speed sounding the note; the next speed, the note and its super octave. For an obvious change in the position of the stop frames, the slow speed would sound the note, and the next speed the note and its sub octave.

It is evident that to use the coupling connections, at least one of the speaking stops 67 must be pushed in, and the coupler stops, such as 67ª, must be pushed in in pairs.

I claim as new:—

1. In an instrument for producing vibrations, the combination of a source of electricity, a plurality of vibrating bodies, means for controlling the vibration thereof connected to one terminal of said source, a plurality of electrical contacts normally disconnected from said controlling means, means for selectively connecting said controlling means to said contacts, a key and means connected to the other terminal of said source of electricity operated by said key for closing the circuit through a variable number of said contacts, the number depending only upon the speed impressed upon said key.

2. In an instrument for producing vibrations, the combination of a source of electricity, a plurality of vibrating bodies, means for controlling the vibrations thereof connected to one terminal of said source, a plurality of electrical contacts normally disconnected from said controlling means, means for selectively connecting said controlling means to said contacts, a key, and means connected to the other terminal of said source operated by said key for closing the circuit through any one of said contacts, the one depending only upon the speed impressed upon said key.

3. In an instrument for producing vibrations, the combination of a source of electricity, a plurality of vibrating bodies, means for controlling the vibrations thereof connected to one terminal of said source, a plurality of electrical contacts normally disconnected from said controlling means, means for selectively connecting said controlling means to said contacts, a key, means connected to the other terminal of said source operated by said key for closing the circuit through a variable number of said contacts, or through one of said contacts, the one or the number depending only upon the speed impressed upon said key, and means for changing at will from the first method of closing the circuit through the contacts to the second method and vice-versa.

4. In an instrument for producing vibrations, the combination of a source of electricity, a plurality of vibrating bodies, means for controlling said vibrating bodies connected to one terminal of said source, fixed contacts, means for selectively connecting said controlling means to said fixed contacts, a key, a contact strip connected to the other terminal of said source moved by said key, and inertia controlled means connected to said contact strip for causing said contact strip to make contact with a greater or less number of said fixed contacts, the number depending only upon the speed impressed upon said key.

5. In an instrument for producing vibrations, the combination of a source of electricity, a plurality of vibrating bodies, means for controlling said vibrating bodies connected to one terminal of said source, fixed contacts, means for selectively connecting said controlling means to said fixed contacts, a key, a contact strip connected to the other terminal of said source moved by said key, and inertia controlled means connected to said contact strip for causing said contact strip to make contact with any one of said fixed contacts, the one depending only upon the speed impressed upon said key.

6. In an instrument for producing vibrations, the combination of a source of electricity, a plurality of vibrating bodies, means for controlling said vibrating bodies connected to one terminal of said source, fixed contacts, means for selectively connecting said controlling means to said fixed contacts, a key, a contact strip connected to the other terminal of said source moved by said key, inertia controlled means connected to said contact strip for causing said contact strip to make contact with a greater or less number of said fixed contacts, the number depending only upon the speed impressed upon said key, and means for shifting said contact strip at will to vary said number.

7. In an instrument for producing vibrations, the combination of a source of electricity, a plurality of vibrating bodies, means for controlling said vibrating bodies connected to one terminal of said source, fixed contacts, means for selectively connecting said controlling means to said fixed contacts, a key, a contact-strip connected to the other terminal of said source moved by said key, inertia controlled means connected to said contact strip for causing said contact strip to make contact with any one of said fixed contacts, the one depending only upon the speed impressed upon said key, and means for shifting said contact strip at will to make contact with another one of said fixed contacts.

8. In an instrument for producing vibrations, the combination of a source of electricity, a plurality of vibrating bodies, means for controlling the vibration thereof connected to one terminal of said source, a key, a plurality of electrical contacts normally disconnected from said controlling means, means for selectively connecting said controlling means to said contacts, a contact strip connected to the other terminal of said source operated by said key for closing the circuit through a variable number of said contacts, the number depending only upon the speed impressed upon said key, and means for increasing said number after the operation of said key and while said key is depressed.

9. In an instrument for producing vibrations, the combination of a source of electricity, a plurality of vibrating bodies, means for controlling the vibration thereof, connected to one terminal of said source, a key, a plurality of electrical contacts normally disconnected from said controlling means, means for selectively connecting said controlling means to said contacts, a contact strip connected to the other terminal of said source operated by said key for closing the circuit through a variable number of said contacts, the number depending only upon the speed impressed upon said key, and means for decreasing said number after the operation of said key and while said key is depressed.

10. In an instrument for producing vibrations, the combination of a source of electricity, a plurality of vibrating bodies, means for controlling the vibrations thereof, connected to one terminal of said source, a key, a plurality of electrical contacts normally disconnected from said controlling means, means for selectively connecting said controlling means to said contacts, a contact strip connected to the other terminal of said source operated by said key for closing the circuit through any one of said contacts, the one depending only upon the speed impressed upon said key, and means for opening said circuit and closing the circuit through any other contact after the operation of said key and while said key is depressed.

11. In a musical instrument, the combination of a plurality of sounding means, fixed contacts, magnets to control the operation of said sounding means connected to said fixed contacts, a key, a contact maker mounted on said key and having a movement relative to said key, located to engage said contacts, the number of said contacts engaged by said contact maker depending upon the position of said contact maker with reference to said key, and means for at will moving said contact maker with reference to said key.

12. In a musical instrument, the combination of a plurality of vibrating bodies, a key, a member carried by said key and capable of moving relatively to said key, and means coöperating with said member for vibrating a number of said vibrating bodies by the operation of said key, the number depending upon the extent of movement of said member with reference to said key.

13. In a musical instrument, the combination of a plurality of vibrating bodies, controlling means therefor, devices for arranging said controlling means in combinations, a key, a member carried by said key and capable of moving relatively to said key, and means coöperating with said member for operating the controlling means arranged in any one, or any number of said combinations, the one or the number depending upon the extent of movement of said member with reference to said key.

14. In a musical instrument, the combination of a plurality of vibrating bodies, a key, a member carried by said key movable thereon, and having a normal position with reference to said key, said member moving from said normal position a distance depending upon the speed of said key, and means coöperating with said member for vibrating a number of said vibrating bodies, the number depending on the extent of said movement of said member.

15. In a musical instrument, the combination of a plurality of vibrating bodies, devices for arranging said vibrating bodies in combinations, a key, a member carried by said key, said member moving relative to said key a distance depending on the speed of movement of said key, and means coöperating with said member for vibrating the vibrating bodies of any one, or any number of said combinations, depending on the extent of movement of said member with reference to said key.

16. In a musical instrument, the combination of a plurality of sets of vibrating bodies, controlling means for said vibrating bodies, keys, a plurality of draw stops, one draw stop for the controlling means of each of said sets of vibrating bodies, means operated by said draw stops for arranging said controlling means in combinations for control by said keys, and means operated by said keys for operating the controlling means in a greater or less number of said combinations, the number depending on the speed impressed on said keys.

17. In a musical instrument, the combination of a plurality of vibrating bodies, fixed contacts, magnets to control the operation of said vibrating bodies connected to said fixed contacts, a key, a contact maker moved by said key and located to engage said contacts, the number of said contacts engaged by said contact maker depending upon the position of said contact maker with reference to said fixed contacts, and means for varying the position of said contact maker with reference to said fixed contacts while said key is depressed.

18. In a musical instrument, the combination of a plurality of sounding means, controlling means therefor, keys, a plurality of draw stops for connecting said controlling means for control by said keys, each of said draw stops being capable of movement into a position in which said controlling means are inoperative, and into a plurality of positions in which said controlling means are operative, operative connections between said draw stops and said controlling means and means for operating a number of said controlling means, the number depending on the speed impressed on said key.

19. In a musical instrument, the combination of sounding means and magnets for controlling the operation of said sounding means, with a key, a draw stop and connections for connecting said magnets for control by said key, said draw stop being capable of movement into one position in which said magnets are not controlled by said key and into a plurality of positions in which said magnets are controlled by said key.

20. In a musical instrument, the combination of keys, a plurality of sets of sounding means, means for sounding said sounding means, movable frames, one frame for each set, operative connections between said frames and said second-named means, means for moving each of said frames to a plurality of positions, and operative connections between said frames and said keys including means whereby the operative connections of any set are used only when the corresponding keys are depressed at a speed determined by the position in which the frame for that set is placed.

21. In a musical instrument, the combination of keys, a plurality of sets of sounding means, means for sounding said sounding means, movable draw stops, one draw stop for each set, operative connections between said draw stops and said second-named means, means for moving each of said draw stops to a plurality of positions, and operative connections between said draw stops and said keys including means whereby the operative connections of any set are used only when the corresponding keys are depressed at a speed determined by the position in which the draw stop for that set is placed.

22. In a musical instrument, the combination of a plurality of sounding means, controlling means therefor, keys mounted on a movable frame, means for connecting said controlling means in combinations, and inertia-controlled means operated by said key for controlling the operation of the controlling means in either a plurality of combinations, or in any single combination depending upon the position of the frame when the keys are operated.

23. In a musical instrument, the combination of a plurality of sounding means, controlling means therefor, keys, a movable frame supporting said keys, means for arranging said controlling means in combinations, devices operated by said key to control the operation of the controlling means in any one of said combinations, or to control the operation of the controlling means in any number of said combinations, the one or the number depending upon the speed of said key, and means for moving said frame to change from one form of operation to the other.

24. In mechanism for controlling vibrating bodies, the combination of a source of electricity, magnets adapted to control the operation of said vibrating bodies connected to one terminal of said source, a key, a contact strip moved by said key and having movement varying in extent with the speed of said key and connected to the other terminal of said source, contacts connected to said magnets and located to be engaged by said contact strip, whereby electricity will flow through a greater or less number of said magnets, the number depending only on the speed of said key.

25. In mechanism for controlling vibrating bodies, the combination of a source of electricity, magnets adapted to control the operation of said vibrating bodies connected to one terminal of said source, a key, a contact strip moved by said key and having a movement varying in extent with the speed of said key and connected to the other terminal of said source, means for supporting said contact strip near its superior limit of movement, and contacts connected to said magnets and located to be engaged by said contact strip whereby electricity will flow through a greater or less number of said magnets, the number depending only on the speed of said key.

26. In mechanism for controlling vibrating bodies, the combination of a source of electricity, magnets adapted to control the operation of said vibrating bodies connected to one terminal of said source, a key, a contact strip moved by said key and having a movement varying in extent with the speed of said key during the early part of the movement of said key and connected to the other terminal of said source, and contacts connected to said magnets and located to be engaged by said contact strip, whereby electricity will flow through a greater or less number of said magnets, the number depending only on the speed of said key.

27. In an instrument for producing vibrations, the combination of a plurality of vibrating bodies, a source of electricity, means for controlling said vibrating bodies connected to one terminal of said source, a key, a plurality of contacts connected to said controlling means, a contact strip connected to the other terminal of said course moved by said key, and inertia-controlled means connected to said contact strip for causing said contact strip to make contact with a variable number of said contacts.

28. In an instrument for producing vibrations, the combination of a plurality of vibrating bodies, a source of electricity, means for controlling said vibrating bodies connected to one terminal of said source, a key, a plurality of contacts connected to said controlling means, a contact strip connected to the other terminal of said source moved by said key, inertia-controlled means connected to said contact strip for causing said contact strip to make contact with a variable number of said contacts, and means for afterward varying said number at will and while said key is depressed.

29. In an instrument for producing vibrations, the combination of a plurality of vibrating bodies, a source of electricity, means for controlling said vibrating bodies connected to one terminal of said source, a key, a plurality of contacts connected to said controlling means, a contact strip connected to the other terminal of said source moved by said key, inertia-controlled means connected to said contact strip for causing said contact strip to make contact with a variable number of said contacts, and means for shifting said key while it is depressed to vary said number.

30. In a device for producing vibrations, the combination with a source of electricity, a plurality of vibrating bodies, electrically-operated controlling means for the same connected to one terminal of said source, a key, and a plurality of conductors, of means for selectively connecting any one of said controlling means to any one of said conductors, and means moved by said key and connected to the other terminal of said source of electricity for supplying electricity to a greater or less number of said conductors, the number depending upon the speed of movement of said keys.

31. In a device for producing vibrations, the combination with a source of electricity, a plurality of vibrating bodies, electrically-operated controlling means for the same connected to one terminal of said source, a key, and a plurality of conductors, of means for selectively connecting any one of said controlling means to any one of said conductors, means moved by said key and connected to the other terminal of said source of electricity for supplying electricity to a greater or less number of said conductors, the number depending on the speed of movement of said keys, and means for afterward increasing or decreasing the number of said electrically-supplied conductors at will and while said key is depressed.

32. In a device for producing vibrations, the combination with a source of electricity, a plurality of vibrating bodies, electrically-operated controlling means for the same connected to one terminal of said source, a key, and a plurality of conductors, of means for selectively connecting any one of said controlling means to any one of said conductors, means moved by said key and connected to the other terminal of said source of electricity for supplying electricity to a greater or less number of said conductors, the number depending upon the speed of movement of said keys, and means for afterward moving said last named means for changing the supply of electricity to other conductors at will and while said key is depressed.

33. In a musical instrument, the combination with a key, of an electric circuit having a plurality of branches, a plurality of sound producing devices having controlling magnets, one magnet in each branch, means for connecting any one of said branches with any other of said branches in combinations, means actuated by the movement of said key for completing the circuit through a greater or less number of said combinations, the number depending on the speed of movement of said key.

34. In a musical instrument, the combination with a key, of an electric circuit having a plurality of branches, a plurality of sound-producing devices having controlling magnets, one magnet in each branch, means for connecting any one of said branches with any other of said branches in combinations, means actuated by said key in its movement for completing the circuit through any one of said combinations, the combination selected depending on the speed of said key.

35. In a musical instrument, the combination with a key, of an electric circuit having a plurality of branches, a plurality of sound producing devices having controlling magnets, one magnet in each branch, means for connecting any one of said branches with any other of said branches in combinations, means actuated by the movement of said key for completing the circuit through a greater or less number of said combinations, the number depending on the speed of movement of said key, and means for afterward moving said last named means for varying said number of electrically-supplied circuits at will and while said key is depressed.

36. In a musical instrument, the combination with a key, of an electric circuit having a plurality of branches, a plurality of sound-producing devices having controlling magnets, one magnet in each branch, means for connecting said branches in combinations, means actuated by said key in its movement for completing the circuit through a greater or less number of said combinations, the number depending on the speed of said key, and means for afterward moving said last named means for completing the circuit through another combination at will and while said key is depressed.

37. In an instrument for producing vibrations, the combination of a source of electricity, a plurality of vibrating bodies, means for controlling said vibrating bodies connected to one terminal of said source, fixed contacts connected to said controlling means, a key, a contact strip connected to the other terminal of said source moved by said key, and means for causing said contact strip to make contact with any number of said fixed contacts, the number depending only upon the speed impressed upon said key.

38. In an instrument for producing vibrations, the combination of vibrating bodies, fixed contacts, magnets to control the operation of said vibrating bodies connected to said fixed contacts, a key, a contact maker moved by said key and located to engage said contacts, the number of said contacts engaged by said contact maker depending upon the position of said contact maker with reference to said key, and means for at will moving said contact maker with reference to said key.

In testimony whereof I affix my signature in presence of two witnesses.

JOHN W. DARLEY, Jr.

Witnesses:
  JOHN CRAMBLITT,
  JNO. H. STIVERS.